(12) United States Patent
Morse

(10) Patent No.: X9774
(45) Date of Patent: Jun. 25, 1836

(54) SPINNING, FLIERS, COTTON

(76) Inventor: John Morse ason Morse, of Newtown, Massachusetts.

Letters Patent.

The schedule referred to in these Letters Patent and making part of the same
containing a description in the words of the said Jason Morse himself of his im-
provement in the mode constructing or making Fliers for spinning Cotton, wool, silk
Flax and Hemp."

To all to whom these presents shall come,
Be it known that Jason Morse of Newtown in the County of Middlesex and
Commonwealth of Massachusetts Machinist hath invented a new and useful im-
provement in the mode of constructing and making fliers for the spinning of Cotton, wool,
silk, Flax or Hemp, and connecting therewith when it is desirable to have such
a connection and in such case making part of said Fliers a Whorse for the pur-
pose of driving the same and that the following is a full and exact description
of the construction and use of said improvement as invented by him, My said invention consists in constructing making and finishing said fliers
and with or without Whorses as their uses may require of one entire piece;
and to accomplish this object I cause the fliers alone or the fliers and whorse
when used in connection and of any desired form or size to be cast entire in
moulds, and of Malleable iron or steel so that they may be wrought, on the
rough and finished as the operating mechanic may desire and so as to adapt them
to all uses for which the common fliers as now usually constructed are applied The great practical benefits arising from the use of fliers constructed in
this mode invented by me is - that the flier being of one entire piece, and being
well and sufficiently tempered is stiff and durable having no connecting joints
as in the common flier, which is constructed of four or more pieces connected
together by brazing or otherwise, and its rapid motion when applied to use, frequent
ly causes the parts to work loose, Whatever may be [illegible] or mentioned in the foregoing specification
my whole invention consists in the invention whereby - Fliers alone or Fliers with
Whorses - may be cast in one entire piece, and finished from said castings I lay no claim to the Invention of Malleable iron or Steel or to any other material used for their construction, The model transmitted marked 1. exhibits one of my fliers.. cast entire and finished from the rough that marked 2, exhibits a flier with the whirl connected - being one entire piece of casting..

In testimony that the above is a true specification of my said invention as above described, I have hereunto set my hand this twenty eighth day of September in the year of our Lord one thousand eight hundred and thirty five.

Witnesses
Thomas A. [illegible]
J. Amory Davis

Jason Morse

[illegible]